United States Patent
Yushiya

(10) Patent No.: US 9,946,146 B2
(45) Date of Patent: Apr. 17, 2018

(54) CONTROL APPARATUS CONFIGURED TO CONTROL PROJECTION OF AN IMAGE BASED ON POSITION INFORMATION, PROJECTION INFORMATION, AND SHAPE INFORMATION, CORRESPONDING CONTROL METHOD AND CORRESPONDING STORAGE MEDIUM

(71) Applicant: CANON KABUSHIKI KAISHA, Tokyo (JP)

(72) Inventor: Akihiko Yushiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 14/919,531

(22) Filed: Oct. 21, 2015

(65) Prior Publication Data
US 2016/0119602 A1    Apr. 28, 2016

(30) Foreign Application Priority Data

Oct. 27, 2014  (JP) .................................. 2014-218725

(51) Int. Cl.
| | |
|---|---|
| G03B 21/00 | (2006.01) |
| G03B 21/26 | (2006.01) |
| H04N 9/31 | (2006.01) |
| G03B 21/14 | (2006.01) |

(52) U.S. Cl.
CPC ............. *G03B 21/26* (2013.01); *G03B 21/00* (2013.01); *G03B 21/14* (2013.01); *G03B 21/142* (2013.01); *G03B 21/147* (2013.01); *H04N 9/3147* (2013.01); *H04N 9/3185* (2013.01); *H04N 9/3194* (2013.01)

(58) Field of Classification Search
CPC .. H04N 9/3147; H04N 9/3185; H04N 9/3194; G03B 21/142; G03B 21/00; G03B 21/14; G03B 21/147; G03B 21/26
See application file for complete search history.

(56) References Cited

U.S. PATENT DOCUMENTS

| | | | | |
|---|---|---|---|---|
| 2011/0116055 | A1* | 5/2011 | Nakamura | G03B 21/14 353/82 |
| 2015/0070591 | A1* | 3/2015 | Murayama | H04N 9/3185 348/745 |

FOREIGN PATENT DOCUMENTS

| | | |
|---|---|---|
| JP | 2001-320652 A | 11/2001 |
| JP | 2011-254411 A | 12/2011 |

* cited by examiner

*Primary Examiner* — Sultan Chowdhury
*Assistant Examiner* — Magda Cruz
(74) *Attorney, Agent, or Firm* — Canon U.S.A., Inc. IP Division

(57) ABSTRACT

A position acquiring unit acquires position information for identifying a position of a projection surface on which a first projecting unit projects an image. A projection information acquiring unit acquires projection information related to the projection performed by a second projecting unit. The controlling unit controls the first projecting unit to project an image on the projection surface based on the position information and the projection information.

13 Claims, 12 Drawing Sheets

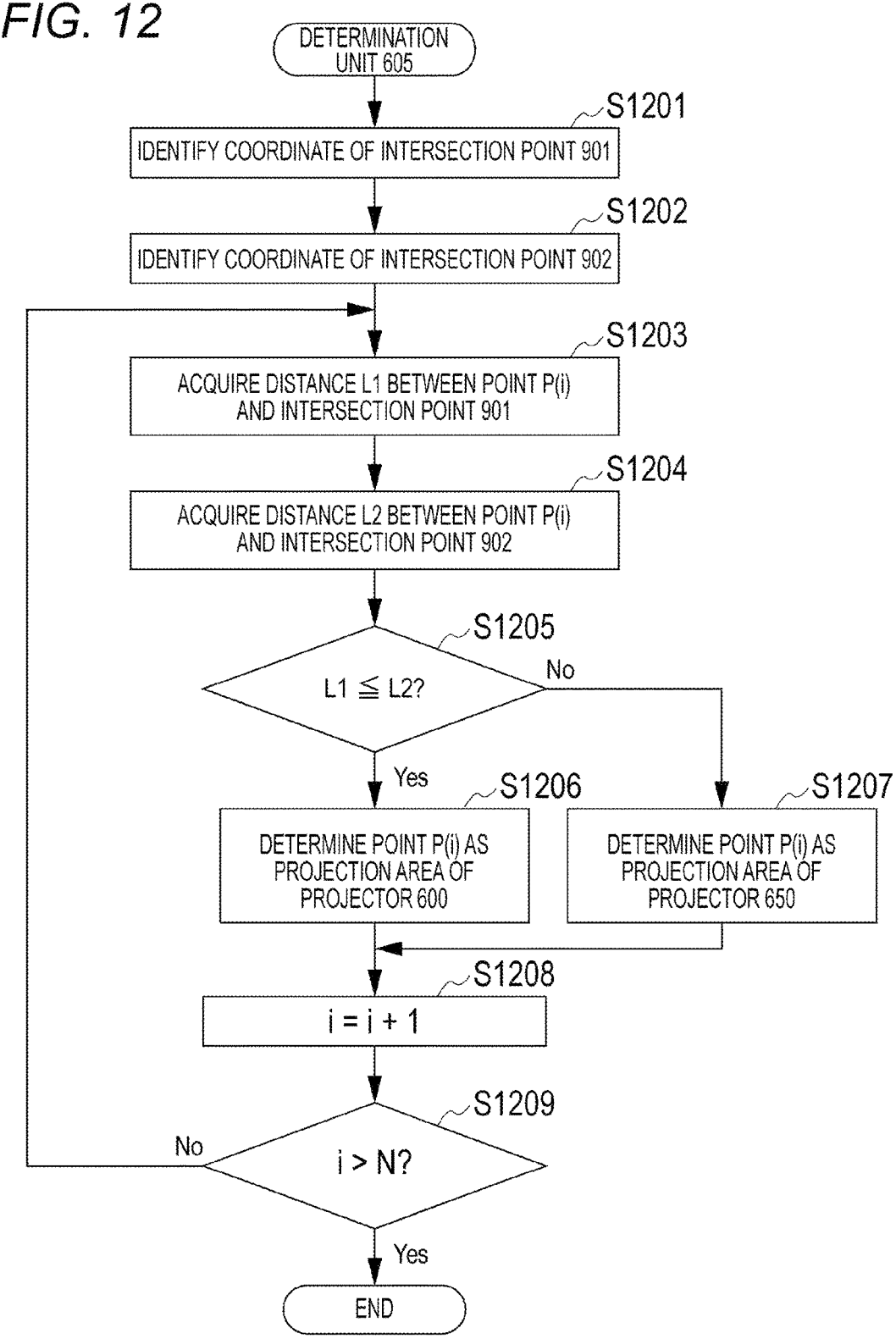

CONTROL APPARATUS CONFIGURED TO CONTROL PROJECTION OF AN IMAGE BASED ON POSITION INFORMATION, PROJECTION INFORMATION, AND SHAPE INFORMATION, CORRESPONDING CONTROL METHOD AND CORRESPONDING STORAGE MEDIUM

BACKGROUND OF THE INVENTION

Field of the Invention

The present invention relates to a technique for projecting an image on a solid.

Description of the Related Art

Conventionally, an image is projected on a solid object, such as a building and a figure, using a projector.

Conventionally, a technique is known which identifies a positional relationship between a projector and a screen based on an image of the screen captured by the projector and determines a projection area on which the projector projects an image based on the identified information.

Japanese Patent Application Laid-Open No. 2011-254411 discloses a technique for projecting an image on a solid screen attached to the face of a person.

Japanese Patent Application Laid-Open No. 2011-254411 also discloses a technique of capturing an image of a plurality of invisible light markers provided on a solid screen with a marker photographing device to acquire position information and direction information of the solid screen. A technique of producing a projected image in a manner that the size and the direction correspond to the solid screen based on the position information and the direction information of the solid screen is also disclosed.

The projection system disclosed in Japanese Patent Application Laid-Open No. 2011-254411 can acquire the position and the facing direction of a portion of the solid screen where invisible light markers are disposed but cannot acquire the information on the solid shape of the solid screen. For example, the information on uneven shape of the projection surface of the solid screen cannot be acquired.

Therefore, the projection system disclosed in Japanese Patent Application Laid-Open No. 2011-254411 may fail to project an image on a solid screen in a form which a user desires, because the image is projected without considering the shape of the solid screen.

SUMMARY OF THE INVENTION

To address the aforementioned problem, a control apparatus according to an embodiment can be configured as follows. The control apparatus includes a position acquiring unit configured to acquire position information for identifying the position of the projection surface on which an image is projected by a first projecting unit, a projection information acquiring unit configured to acquire projection information related to the projection by a second projecting unit, and a controlling unit configured to control the first projecting unit to project an image on the projection surface based on the position information and the projection information.

Further features of the present invention will become apparent from the following description of exemplary embodiments (with reference to the attached drawings).

BRIEF DESCRIPTION OF THE DRAWINGS

FIG. 12 is a flow chart of a determination process to determine a projection area in the second embodiment.

DESCRIPTION OF THE EMBODIMENTS

First Embodiment

A first embodiment will now be described for a case where a projector 100 which is a projection control apparatus projects an image on a solid used as a screen (projection target). In the embodiment, the solid can move. The solid used as a screen may be, for example, a car or a human body.

Figure 3:
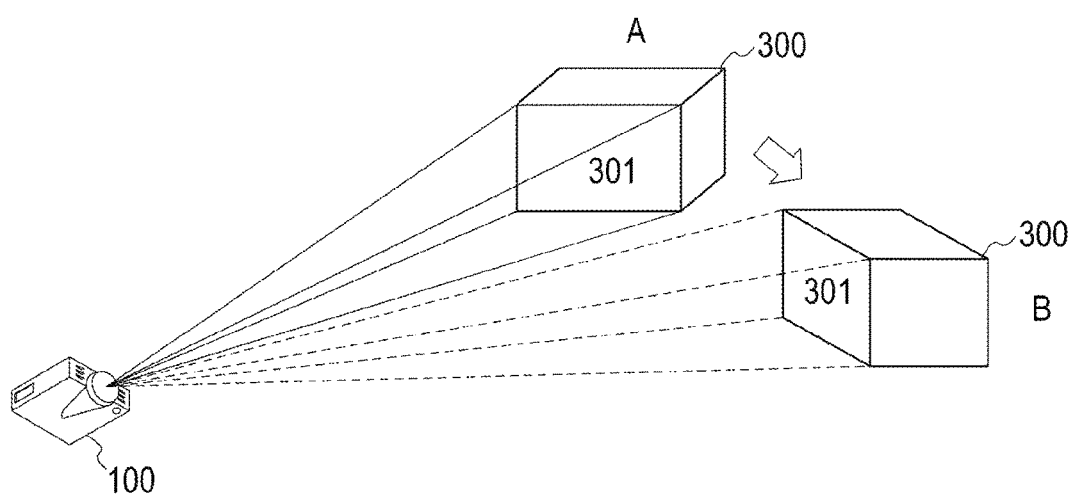
FIG. 3 illustrates a projecting process to project an image on a moving solid.

A projection process performed by the projector 100 according to the embodiment will be described referring to an example illustrated in FIG. 3. FIG. 3 illustrates a cuboid solid 300 moving from a position A to a position B. The solid 300 is used as a screen on which the projector 100 projects an image. Description will be made for the embodiment for a case where the projector 100 projects an image on a face 301 of the solid 300. The projector 100 moves the target position to project an image and transforms the shape of the image to be projected corresponding to the movement of the solid 300 so that the image is kept projected on the face 301 along with the movement of the solid 300.

Movement and transformation of a projected image viewed along the direction from the projector 100 to the screen during the example projection process illustrated in FIG. 3 will be described referring to FIG. 4.

An area 400 is a projection area of an image projected on the face 301 of the solid 300 at the position A in FIG. 3.

The area 401 is a projection area of an image projected on the face 301 of the solid 300 at the position B in FIG. 3.

As described above, the projector 100 according to the embodiment transforms the shape of an image to be projected when the screen moves relatively to the projector 100. In this manner, an image can be projected with the same appearance on a predetermined projection area on the screen after the movement as the image projected on the screen before the movement.

Figure 4:
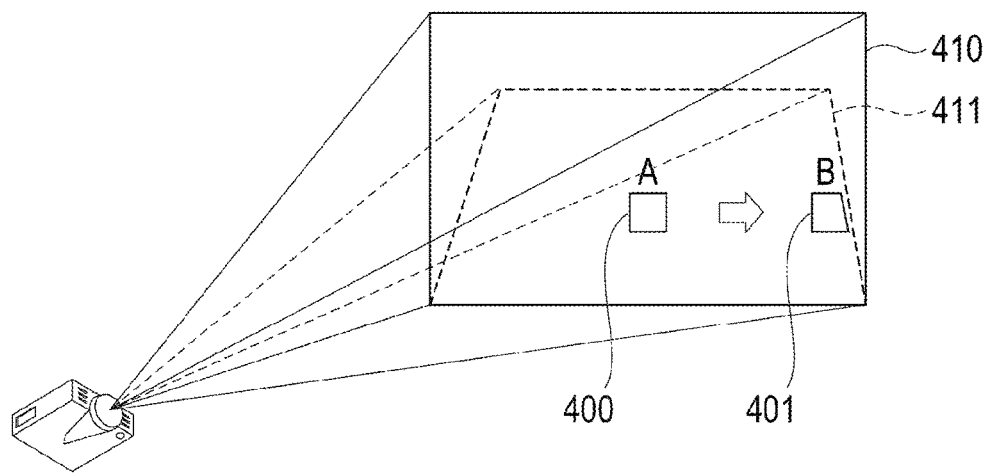
FIG. 4 illustrates the movement of a projection area when projecting an image on a moving solid.

In the example illustrated in FIG. 4, a projectable area 410 is the area where the projector 100 can project an image having the shape of the area 400. A projectable area 411 is the area where the projector 100 can project an image having the shape of the area 401.

The configuration of the projector 100 will now be described referring to a block diagram illustrated in FIG. 1.

The acquiring unit 101 acquires information on the screen. The information on the screen includes position information indicating the position of the moving screen. This position information is a first position information to identify the position of the solid object on which a projecting part 108, which will be described later, projects an image. Using the position information, a determination unit 104, which will be described later, can identify the positional relationship between the projecting part 108 that projects an image on the screen and the screen.

For example, the position information indicating the position of the screen may indicate the position of the screen in a projectable range of the projector 100. Alternatively, for example, the position information may indicate the distance between the projector 100 and the screen or the angle of the optical axis of the projecting part 108 of the projector 100 to the projection surface of the screen. These pieces of information may be combined to be used as position information. These pieces of information are merely examples. The position information indicating the position of the screen is not limited to the example information described above.

The acquiring unit 101 may be, for example, a photographing unit such as a camera that captures an image of the screen. In this case, the acquiring unit 101 acquires a captured image of the screen as the information on the screen. The acquiring unit 101 is not necessarily a camera. For example, the acquiring unit 101 may acquire information on the screen using an infrared sensor. Alternatively, the information on the screen may be acquired from a device external to the projector 100. In this manner, the acquiring unit 101 can acquire the information on the screen to acquire the position information of the screen.

The setting unit 102 decides a screen on which the projector 100 projects an image. The setting unit 102 also decides a projection area on the screen. In the example illustrated in FIG. 3, the solid 300 is decided to be used as the screen. Particularly, the face 301 among faces of the solid 300 is decided to be used as a projection area to project an image thereon.

When a screen to project an image has been decided, the projector 100 can recognize the movement of the screen and keep an image projected on the moving screen.

In addition, by deciding a projection area on the screen, even when the relative position of the projection area to the projector 100 moves along with the movement of the screen, the projector 100 can keep an image projected on the projection area.

In the embodiment, a user selects a solid model to be used as a screen among solid models whose shape information is stored in a storing unit 103 described later. The setting unit 102 decides the solid object selected by a user to be used as a screen. The user selects an area among areas on the selected solid on which an image is to be projected. For example, a user can select an area based on, for example, whether an image is to be projected on a cuboid screen, a cylindrical screen, or a spherical screen. Although, the shape of the screen is not limited to these example shapes.

For example, a solid model selected by a user is displayed on a monitor or the like connected to the projector 100. A user can select an area on the solid model to be used as a projection area on which an image is projected. For example, a projection area can be decided by specifying a corner point of the projection area on the solid model by a pointer or the like. Alternatively, a user may select a face of the solid object as a projection area. The solid model is not necessarily displayed on a monitor but may be projected on a screen by the projecting part 108. Alternatively, a screen and a projection area on the screen may be decided based on a captured image acquired by the acquiring unit 101. The captured image is an image of an object positioned in the direction in which the projector 100 projects an image.

For example, a user can specify, by a pointer or the like, an object in the captured image to select the object to be used as a screen. In this case, the object selected by the user as a screen is associated with the shape of a solid stored in the storing unit 103. The associating process may be performed by a user. Alternatively, the associating process may be performed automatically. Alternatively, a solid object of which shape information is stored in the storing unit 103 may automatically be detected from the captured image to be decided as a screen. The method of deciding a screen and the method of deciding a projection area performed by the setting unit 102 are not particularly limited.

The storing unit 103 stores the shape information of a solid to be used as a screen. For example, the projector 100 can previously acquire shape information from an information processing device, such as a personal computer (PC), a 3D scanner, or a 3D printer, and store the shape information in the storing unit 103. The shape information stored in the storing unit 103 may be on the solid shape of the whole screen. Alternatively, the shape information may be on a solid shape of a portion of the screen, such as the information on only the projection surface.

For example, the storing unit 103 may be a random access memory (RAM) or a hard disk. Alternatively, an external storage device connectable to the projector 100, such as a memory card, may store the shape information.

Based on the information on the screen acquired by the acquiring unit 101 and the shape information on the screen stored in the storing unit 103, the determination unit 104 identifies the position of the projection area decided by the setting unit 102 in the captured image.

The information on the screen acquired by the acquiring unit 101 is, for example, information acquired from the captured image of an object positioned in the direction in which the projector 100 projects an image. The information acquired from the captured image includes the position information of the screen. The position information indicating the position of the screen may indicate the position of the screen in a projectable range of the projector 100 as described above. Alternatively, for example, the position information may indicate the distance between the projector 100 and the screen or the angle of the optical axis of the projecting part 108 of the projector 100 to the projection surface of the screen.

The determination unit 104 acquires the setting information decided by the setting unit 102. The determination unit 104 acquires the shape information of the solid decided to be used as a screen from the storing unit 103. The determination unit 104 determines whether the decided screen appears in the captured image according to the shape information acquired from the storing unit 103. In the embodiment, the position and the direction of the screen can be detected from any face of the solid appearing in the captured image because the shape information has three dimensional information.

The three dimensional shape information of the solid decided as a screen indicates the relative position of each point on the solid to the origin which is an arbitrarily selected point on the solid. For example, when a solid decided as a screen is a cuboid, the shape information indicates the positional relationship between a corner point selected among six corner points as an origin and each of the other five corner points. For example, when a solid decided as a screen is a cylindrical solid, the three dimensional information includes the information indicating the distance between the origin which is the center of a circular bottom face and the circular arc of the bottom face (radius). The information indicating the distance between the center of the bottom face and the center of the opposing circular top face (the height of the cylinder) is also included.

The determination unit 104 controls the projectable range of the projector 100 in three dimensional coordinate system. For example, the determination unit 104 controls the projection range of the projector 100 in the three dimensional coordinate system having the origin at the position of the projecting part 108 of the projector 100 and three axes along the optical axis of the projecting part 108, the direction horizontal to the face on which the projector 100 is placed, and the vertical direction.

By using the position of the origin determined on the solid decided as a screen in the coordinate system for controlling the projection range of the projector 100 and the three dimensional information of the solid, the determination unit 104 identifies the position and the facing direction of the solid in the projection range of the projector 100. In this manner, the determination unit 104 can identify the three dimensional position of each point on the solid screen in the three dimensional coordinate system.

Based on the position information acquired by the acquiring unit 101, the shape information acquired by the storing unit 103, and the setting information decided by the setting unit 102, the determination unit 105 determines an area on which an image is actually projected in the area where the projector 100 can project an image (hereinafter referred to as "projectable area"). In the embodiment, the determination unit 105 determines coordinate values in the coordinate system determined in the projectable area to determine the projection area of an image. The determination unit 105 determines the projection area of an image in the projectable area to determine the form of an image projected on the solid by the projecting part 108. The determination unit 105 determines the projection area of an image in the projectable area to determine the projecting position of an image.

The input unit 106 inputs image data to be projected on the screen by the projecting part 108. For example, the input unit 106 inputs the image data output from an information processing device, such as a PC.

The controller 107 performs transformation processing of the image data input by the input unit 106. The controller 107 transforms the image data based on the coordinates determined by the determination unit 105. For example, the transformation processing is performed to the image data input by the input unit 106 so that the image data is projected with its distortion corrected on the projection area determined by the determination unit 105. The controller 107 outputs the transformed image data to the projecting part 108. In this manner, the controller 107 controls the projecting part 108 to project the image data in a form corresponding to the shape determined by the determination unit 105 on the solid. The controller 107 controls the projecting part 108 to project the image data on the projecting position determined by the determination unit 105.

The projecting part 108 projects an image processed through the transformation processing in the controller 107 on the screen. The image projected by the projecting part 108 may be a moving image or a still image.

Figure 1:
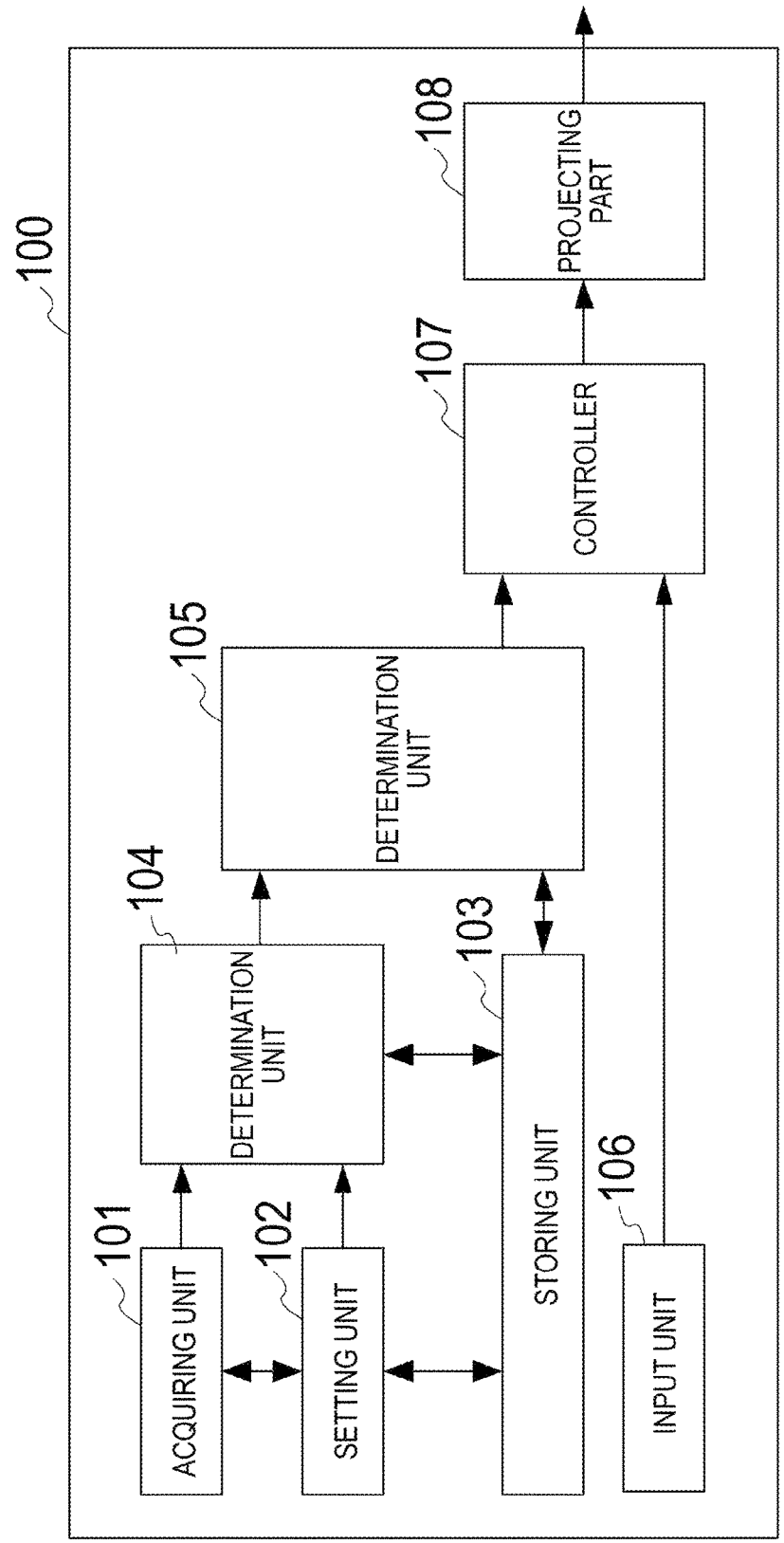
FIG. 1 is a functional block diagram of a projector according to a first embodiment.

A portion of or the whole function of the blocks illustrated in FIG. 1 may be configured with hardware. In this case, each block may be a single hardware unit, or several blocks may constitute an integrated hardware unit. Alternatively, a portion of or the whole function of the blocks illustrated in FIG. 1 may be realized by a processor executing a program stored in a storage medium.

Figure 10:
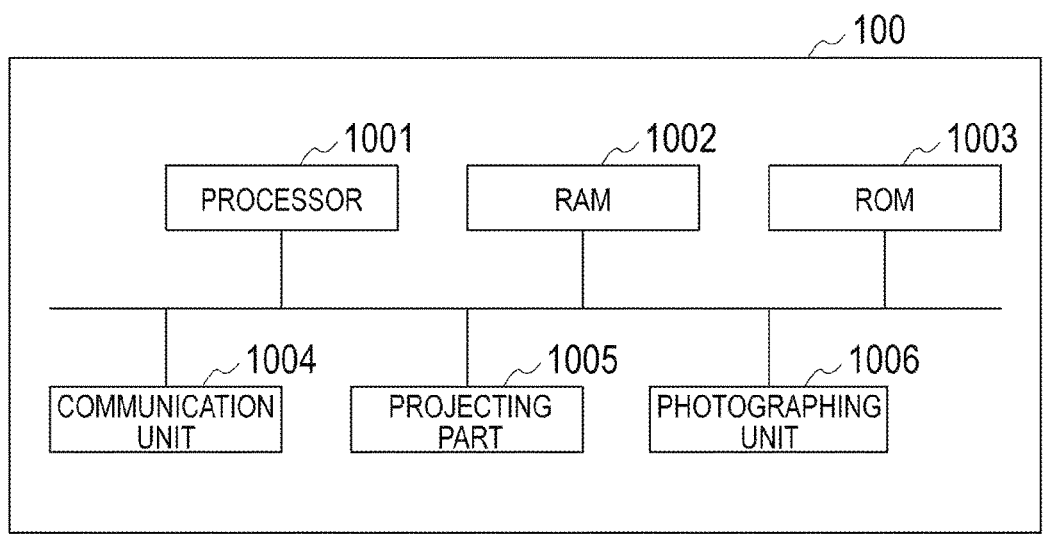
FIG. 10 illustrates an example configuration of the projector.

FIG. 10 illustrates an example configuration in which the projector 100 includes a processor. The processor 1001 reads and executes a program stored in a read only memory (ROM) 1003. The processor 1001 may be, for example, a central processing unit (CPU) or a graphics processing unit (GPU).

The processor 1001 realizes functions of the setting unit 102, the determination unit 104, the determination unit 105, and the controller 107 illustrated in FIG. 1.

The RAM 1002 deploys the program read from the ROM 1003 by the processor 1001. The RAM 1002 is used as a work space for the processor 1001.

The ROM 1003 is a storage medium for storing the program to be executed by the processor 1001. The ROM 1003 stores the shape information of a solid. The ROM 1003 is configured to realize the function of the storing unit 103 illustrated in FIG. 1.

The communication unit 1004 is a communication interface for acquiring an image to be projected by the projector 100 from an external device, such as a PC. The communication unit 1004 is configured to realize the function of the input unit 106 illustrated in FIG. 1.

The processor 1001 controls the projecting part 1005 to project an image data on a screen. For example, the projecting part 1005 may include a light source, a display unit for displaying an image to be projected, a prism, a mirror, and a projection lens. The configuration of the projecting part 1005 is not particularly limited. The projecting part 1005 is configured to realize the function of the projecting part 108 illustrated in FIG. 1.

The photographing unit 1006 captures an image of the screen. The photographing unit 1006 is, for example, a camera unit. The photographing unit 1006 is configured to realize the function of the acquiring unit 101.

Figure 2:
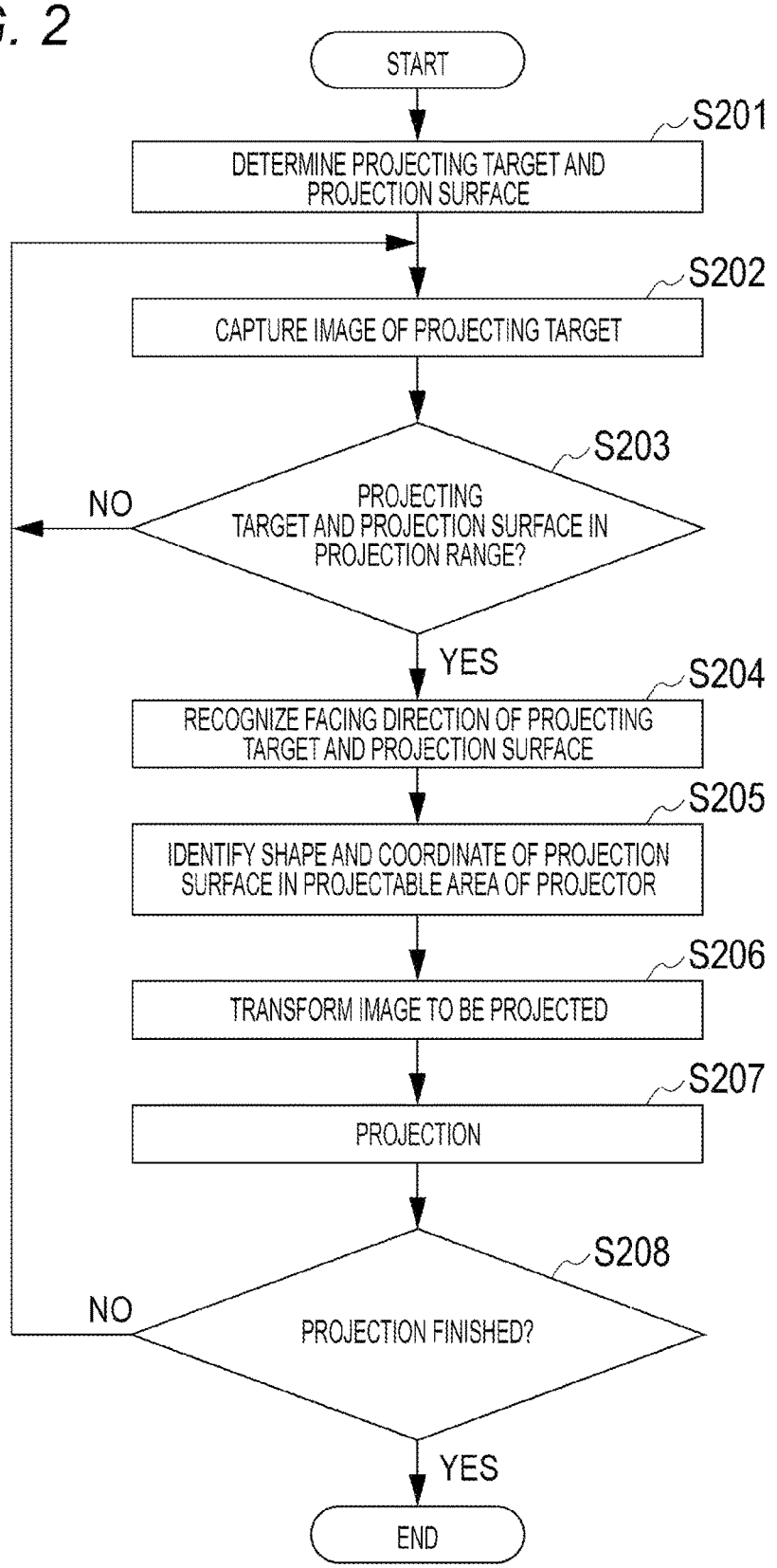
FIG. 2 is a flow chart illustrating an operation of the projector according to the first embodiment.

The operation of the projector 100 according to the embodiment will now be described referring to FIG. 2. For the projector 100 embedded with the processor 1001, the RAM 1002, and the ROM 1003, the processing illustrated in FIG. 2 is realized by the processor 1001 executing a program stored in the ROM 1003. Alternatively, a portion of or the whole processing illustrated in FIG. 2 may be performed by hardware.

When a user gives instruction to the projector 100 to start a projection process, the setting unit 102 determines a screen and a projection area on the screen in step S201.

Then in step S202, the acquiring unit 101 acquires a captured image including a projectable range of the projector 100. In the example illustrated in FIG. 4, the acquiring unit 101 acquires a captured image of the area including the projectable area 410. Then the acquiring unit 101 outputs the acquired captured image to the determination unit 104. In the embodiment, an image capturing the projectable range with no image projected thereto is acquired.

In step S203, the determination unit 104 analyzes the captured image acquired by the acquiring unit 101. The determination unit 104 determines whether the projection area on the screen is included in the projectable area of the projector 100. In the example illustrated in FIG. 4, whether the area 401 corresponding to the projection area on the screen that has moved is included in the projectable area 411 processed through the transformation processing. The processing in the step S203 will be described in detail later referring to FIG. 12. Description will be made for an example case illustrated in FIG. 4 in which the projection area changes along with the movement of the screen, although the invention can be applied to a case in which the screen does not move. For example, a predetermined image can be projected with its distortion corrected on a position on the screen which a user desires based on the position of the screen identified by a captured image acquired by the acquiring unit 101 and three dimensional shape information of the screen stored in the storing unit 103.

If the area 401 is not included in the projectable area 411 (NO in step S203), the step returns to the step S202. If the area 401 is included in the projectable area 411 (YES in step S203), the step proceeds to step S204.

In the step S204, the determination unit 104 determines the facing direction of the screen. The determination unit 104 can determine the facing direction of the screen based on the shape information acquired from the storing unit 103. Based on the determined result, the determination unit 104 identifies the position of the projection area in the image of the screen captured in the captured image acquired by the acquiring unit 101. Then the information indicating the identified position is output to the determination unit 105.

Then in step S205, the determination unit 105 determines the coordinates of the area on which an image is projected in the projectable area of the projector 100 and outputs the determined coordinates to the controller 107. In the example illustrated in FIG. 4, the information indicating the position of the area 401 in the projectable area 411 is output to the controller 107. The output information may be, for example, coordinate values of corner points of the area 401 in the coordinate system determined for the projectable area 411.

Then in step S206, the controller 107 performs transformation processing to the image data input from the input unit 106 based on the coordinate information of the projection area input from the determination unit 105. The resulting transformed image data is output to the projecting part 108 to be projected by the projecting part 108.

In step S207, the projecting part 108 projects the image input from the controller 107.

In step S208, if the coordinate of the projection area has not yet come to the edge of the projectable area of the projector 100, the projecting part 108 returns to the step S202 to continue the series of processing, but if the coordinate has come to the edge, the projecting part 108 finishes projection. For example, if the projector 100 changes the projecting direction and reaches the physical limit where the projecting direction cannot be changed anymore, the projector 100 finishes projecting an image.

Figure 11:
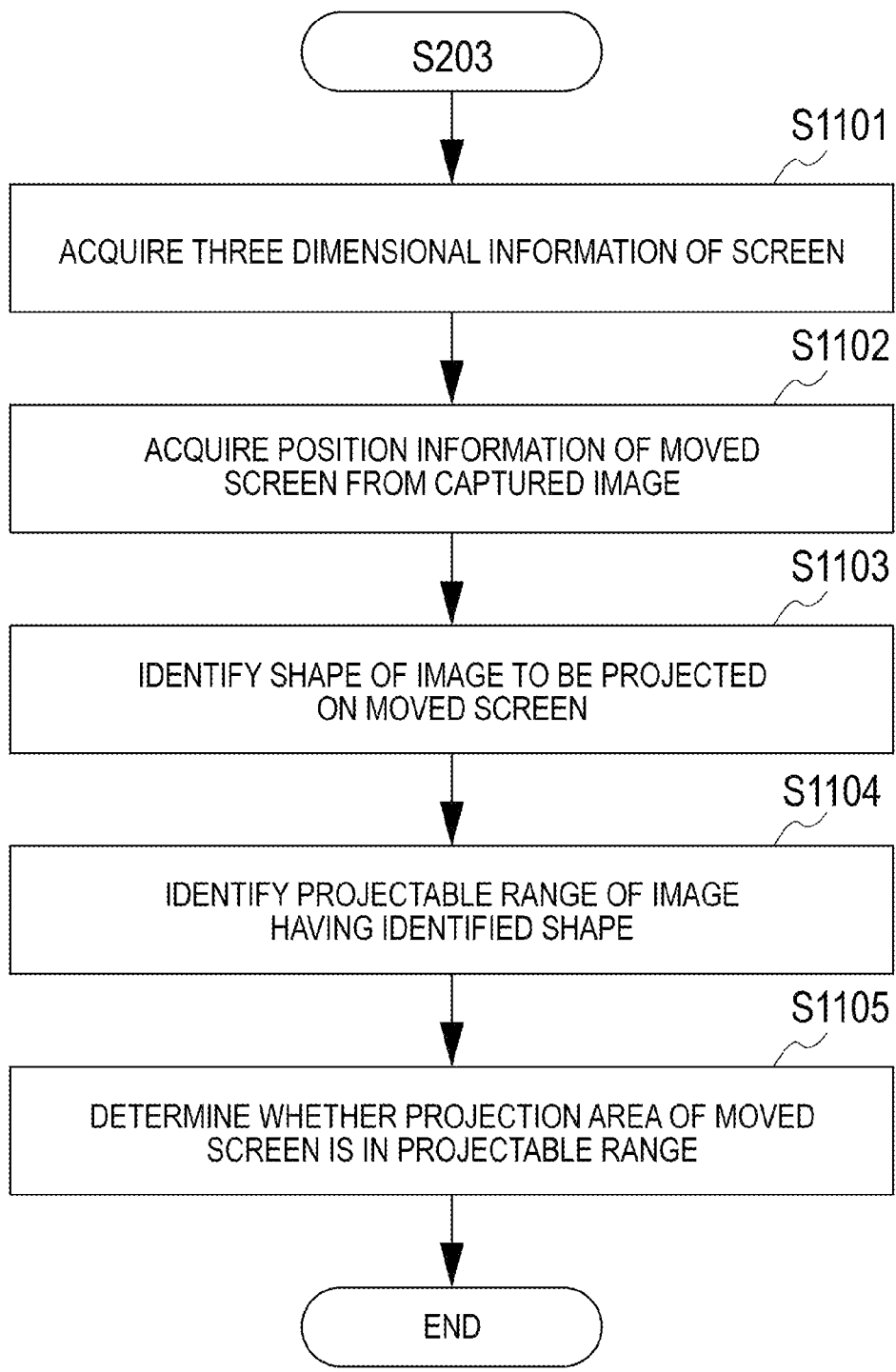
FIG. 11 is a flow chart of a determination process to determine whether an image can be projected.

The processing performed by the determination unit 104 in the step S203 will now be described in detail referring to a flow chart illustrated in FIG. 11.

The determination unit 104 acquires the shape information of the screen from the storing unit 103 (S1101). For example, the determination unit 104 acquires information indicating that an object determined as a screen by the setting unit 102 is a cuboid. The determination unit 104 also acquires information for identifying the longitudinal and lateral lengths of the bottom face of the cuboid as well as the height of the cuboid. In the embodiment, the object determined as a screen is previously associated with the shape information stored in the storing unit 103 by the setting unit 102.

Description is made for the embodiment where the information on the shape of a screen is stored, although the information on a portion of the shape of a screen may be stored. The shape information stored in the storing unit 103 may be any information as long as the information indicates the shape of an area on which the projector 100 projects an image.

Then the determination unit 104 acquires the position information of the screen that has been moved (S1102). For example, the determination unit 104 acquires information indicating the position of the screen in the three dimensional coordinate system that represents the projectable range of the projector 100 and the direction (facing direction) of a face of the solid screen. The information indicating the direction of the screen is, for example, information indicating the relative relationship between the facing direction of the current face of the screen and a plane normal to the projecting direction (optical axis direction) of the projector 100.

The determination unit 104 identifies from the captured image acquired by the acquiring unit 101 the position and the direction of the screen that has been moved. The position and the direction of the screen in the captured image can be identified by comparing the shape information acquired from the storing unit 103 and the information on the shape and the size of the screen captured in the captured image. In the embodiment, the method of detecting the position and the direction of the screen is not particularly limited.

Then the determination unit 104 identifies the shape of an image to be projected on the screen that has been moved (S1103). In the example illustrated in FIG. 4, the area 401 is determined.

As an image is projected farther from the center of the projectable area, the shape of the projected image is distorted. So, the image should be processed to corrected the distortion. The distortion of the shape is caused by, for example, the effect of the curved lens surface which becomes significant as the projecting direction of the projector 100 deviates from the optical axis of the spherical lens constituting the projecting part 108 of the projector 100. The determination unit 104 can determine the degree of deviation of the optical axis of the lens from the direction in which an image is projected (for example, an angle) using the captured image acquired by the acquiring unit 101. For example, the determination unit 104 determines the degree of deviation of the optical axis of the lens from the direction in which an image is projected based on the distance from the center of the projectable area 410 to the position of the screen that has been moved in the captured image. Based on the degree of deviation, the degree of distortion of the image can be identified. By using the identified degree of distortion, the determination unit 104 can identify the shape of the image to be projected on the screen that has been moved.

As described above, the determination unit 104 identifies the three dimensional position of each point on the solid screen in the three dimensional coordinate system. Furthermore, the determination unit 104 can identify the degree of distortion of a projected image based on the relative position of the screen to the optical axis of the projector 100. By using the information, image elements can be disposed on desired points by a unit pixel on the solid screen in a desired manner to project an image.

The determination unit 104 can identify the shape of an image to be projected on the screen that has been moved based on, for example, the facing direction of the screen and the shape information acquired from the storing unit 103. The direction which the projection surface of the screen faces can be identified by comparing the captured image acquired by the acquiring unit 101 with the shape information acquired from the storing unit 103. For example, the determination unit 104 can identify the direction of the screen by determining to which face of the solid indicated by the shape information acquired from the storing unit 103 does the face of the screen included in the captured image corresponds.

The determination unit 104 determines the shape of an image to be projected on the screen facing the identified direction based on the shape information acquired from the storing unit 103. By using the shape information, the shape of the screen facing the identified direction when viewed from the projector 100 can be recognized in detail. Therefore, the shape of an image to be projected can be determined in a manner corresponding to the shape of the screen compared to correction of the projected image performed using only the direction of the screen.

The determination unit 104 then identifies the projectable range in which the projector 100 can project the image having the identified shape (S1104). In the example illustrated in FIG. 4, the projectable area 411 in which an image having the shape of the area 401 can be projected is identified.

The determination unit 104 determines whether the projection area on the screen that has moved is included in the projectable area 411 identified in step S1104. In the manner described above, the determination process is performed in the step S203.

As described above, in the embodiment, the shape information of the screen is used to produce a corrected image to be projected on the screen that has moved by transforming the image projected on the screen before the movement. In this configuration, a corrected image can be produced in a manner corresponding to the shape of the screen compared to correction of a projected image performed based only on the image of the screen captured by the imaging device.

As described above, the shape of an image to be projected is corrected in the embodiment, although which portion of the input image data to be projected may be determined based not only on the shape but also on the information on the direction and the shape of the screen. For example, the projector 100 may not project an image on a portion of the projection area on the screen, which portion facing the direction in which the projector 100 cannot project an image.

As described above, an image is projected using a single projector in the exemplary embodiment, although the number of projectors is not limited to one. The present invention can be applied to a projection system that projects an image using a plurality of projectors.

Figure 5:
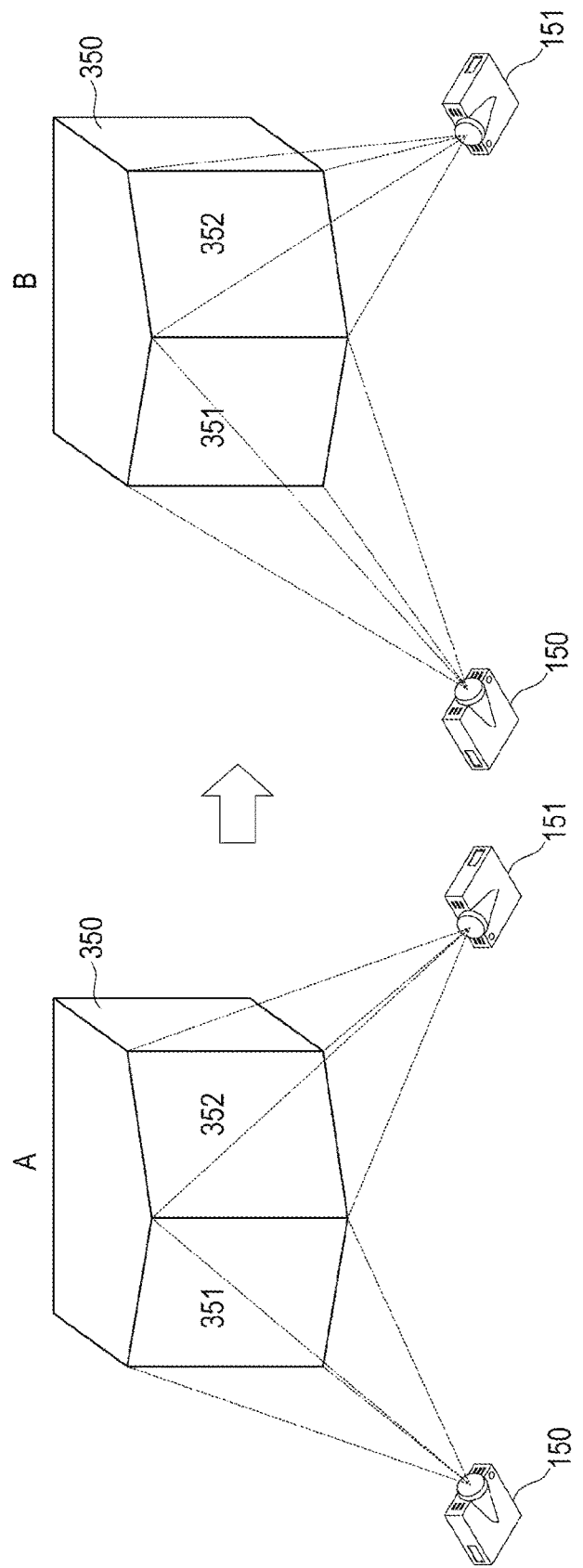
FIG. 5 explains a projecting process to project an image using a plurality of projectors according to the first embodiment.

FIG. 5 illustrates two projectors following the movement of a moving object, on which images are to be projected, to project images on two projection areas on the moving object.

In the example illustrated in FIG. 5, an image is projected on a single screen 350 using the projector 150 and the projector 151. In the example illustrated in FIG. 5, an image is projected on an area 351 and an area 352 on the screen 350.

When the two areas 351 and 352 on the screen 350 are not on a same plane as in the example illustrated in FIG. 5, a single projector may not be able to project an image on the whole projection area depending on the positional relationship between the projector and the projection area. In this case, the projector 150 projects an image on the area 351 and the projector 151 projects an image on the area 352, namely, an image can be projected over two areas 351 and 352.

The projector 150 and the projector 151 each performs processing following the procedure shown in the flow chart illustrated in FIG. 2. The projector 150 performs the processing so as the relationship between the projector 150 and the area 351 to be the same as the relationship between the projector 100 and the face 301 illustrated in FIG. 3. The projector 151 performs the processing so as the relationship between the projector 151 and the area 352 to be the same as the relationship between the projector 100 and the face 301 illustrated in FIG. 3.

As described above, even when images are simultaneously projected on a plurality of faces on the screen having a solid shape, the images can be projected in a manner corresponding to the shape of the projection surfaces.

Second Embodiment

In a second embodiment, an example case where a plurality of projectors can project images on a projection area on the screen and a plurality of projectors cooperatively changes the projection area will be described.

Figure 8:
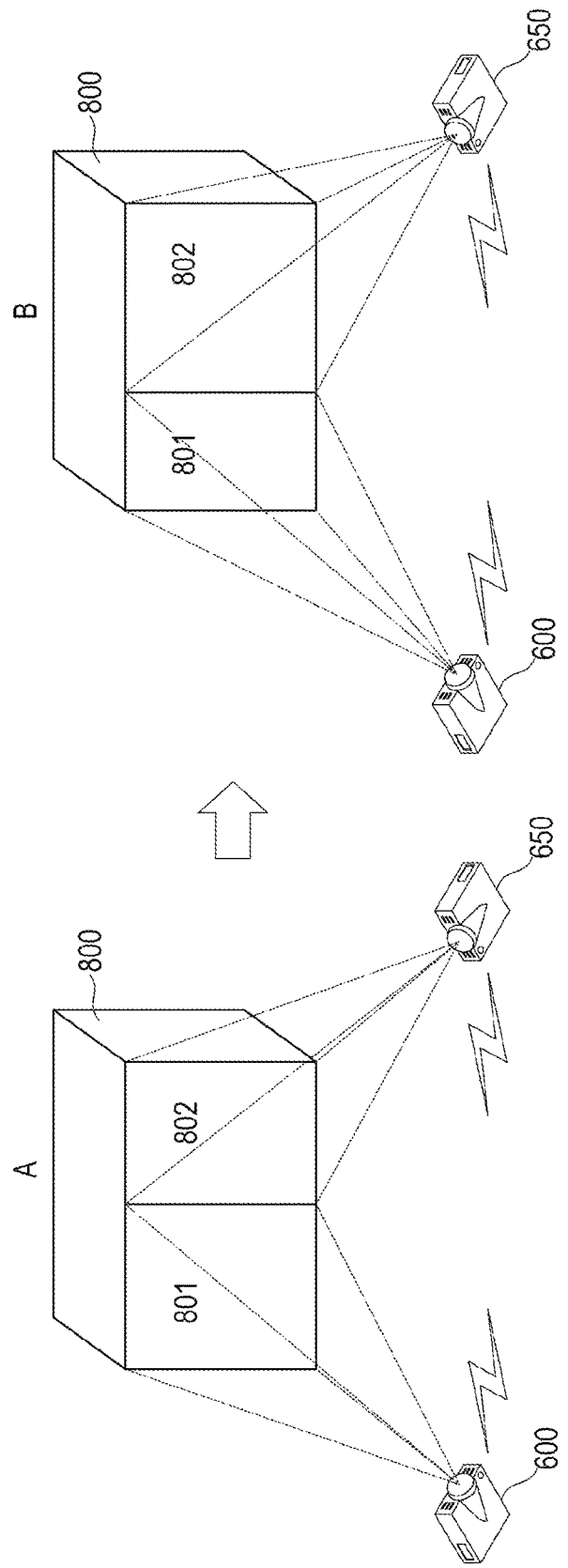
FIG. 8 explains a projecting process to project an image using a plurality of projectors according to the second embodiment.

The processing performed by a plurality of projectors in the second embodiment will be described referring to FIG. 8. The left figure in FIG. 8 illustrates a projector 600 and a projector 650 projecting images on a solid 800, which is used as a screen, at a position A. The right figure in FIG. 8 illustrates the projector 600 and the projector 650 projecting images on the solid 800 which has moved from the position A to a position B.

In FIG. 8, a projection area 801 is the range in which the projector 600 projects an image. A projection area 802 is the range in which the projector 650 projects an image. In the embodiment, the projection areas 801 and 802 are on a same plane, and sizes of the projection areas 801 and 802 on the plane change according to the positional relationship between each projector and the solid 800.

For example, when the solid 800 used as a screen moves from the position A to the position B, the projection areas 801 and 802 change as illustrated in FIG. 8.

Figure 6:
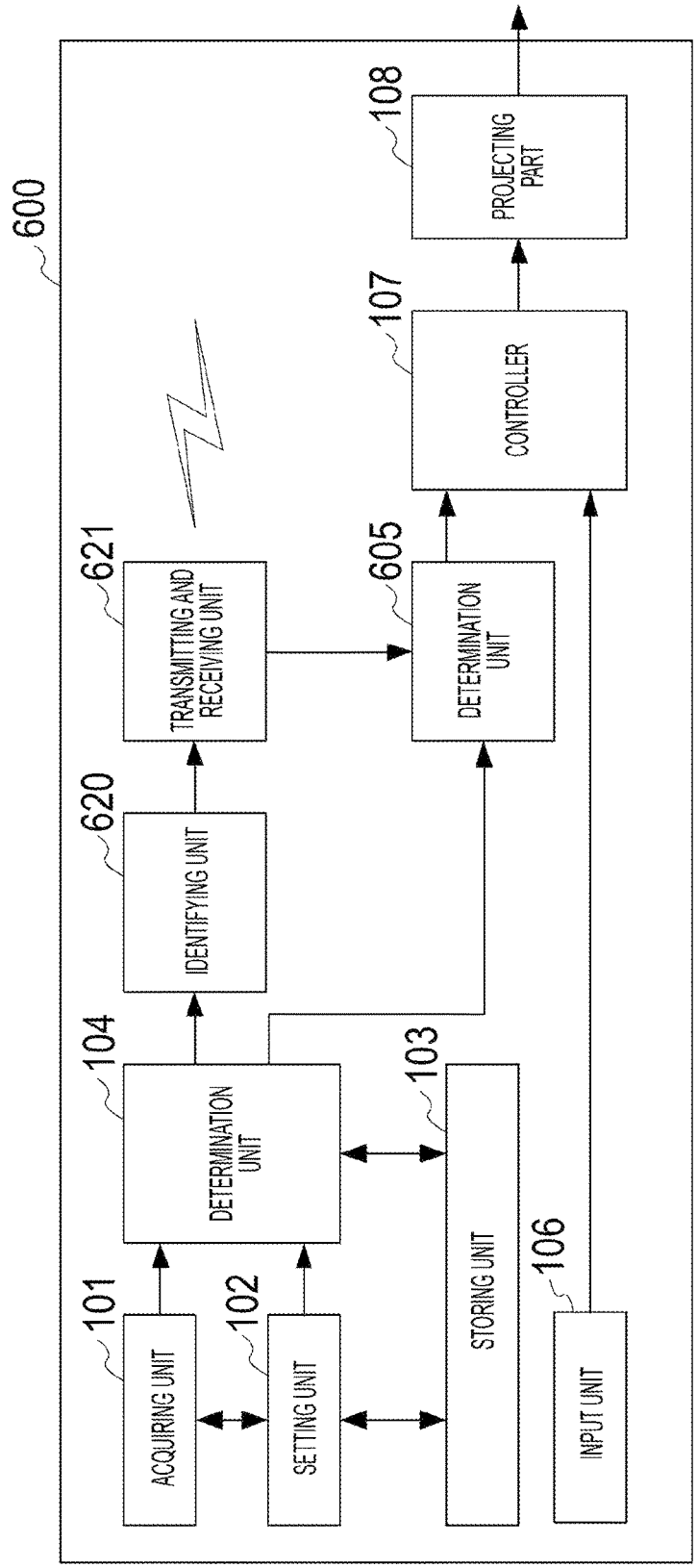
FIG. 6 is a functional block diagram of a projector according to a second embodiment.

FIG. 6 is a block diagram illustrating the function of the projector 600 according to the second embodiment. Among components illustrated in FIG. 6, the same component as in FIG. 1 is appended with the same reference sign and the description is omitted.

A determination unit 605 has the same function as the determination unit 105 described in the first embodiment and in addition determines the projection area of the projector 600 based on the information indicating relative positions of the projector 600 and the projector 650 to the projection area.

An identifying unit 620 identifies the projecting direction from the projector 600 to the projection area. The projecting direction corresponds to the optical axis of the projector 600. The projecting direction of the projector 600 can be identified based on the relative position of the projector 600 to the screen and the facing direction of the screen. The relative position of the projector 600 to the screen and the facing direction of the screen can be identified in a manner similar to the method described in the first embodiment with reference to FIG. 11. The identifying unit 620 acquires a third position information corresponding to the relative position of the projecting part 108 to the screen based on the first position information for identifying the position of the screen.

The transmitting and receiving unit 621 transmits the information indicating the projecting direction of the projector 600 identified by the identifying unit 620 to an external device. The projector 600 transmits the information indicating the projecting direction to the other projector 650. Alternatively, the projector 600 may be configured to transmit the information indicating the direction of the optical axis to the control apparatus which controls the projector 600 and the projector 650. The control apparatus transmits the information received from the projector 600 to the other projector 650. In this manner, the information indicating the direction of the optical axis is directly or indirectly transmitted to the other projector 650.

The transmitting and receiving unit 621 receives the projecting direction of the other projector 650 directly from the other projector 650 or indirectly via the control apparatus. In this manner, the transmitting and receiving unit 621 receives a second position information corresponding to the relative position of the second projecting unit for projecting an image on the solid to the solid.

Similarly to the first embodiment, a portion of or the whole function of blocks illustrated in FIG. 6 can be configured with hardware. Alternatively, a portion of or the whole function of the blocks illustrated in FIG. 6 may be realized by a processor executing a program stored in a storage medium. The function of the blocks illustrated in FIG. 6 may be realized by the configuration illustrated in FIG. 10.

When the functions illustrated in FIG. 6 are realized by the configuration illustrated in FIG. 10, the function of the identifying unit 620 can be realized by the processor 1001 reading a program from the ROM 1003 and deploying and executing the program in the RAM 1002. The function of the transmitting and receiving unit 621 can be realized by the communication unit 1004 illustrated in FIG. 10.

Figure 7:
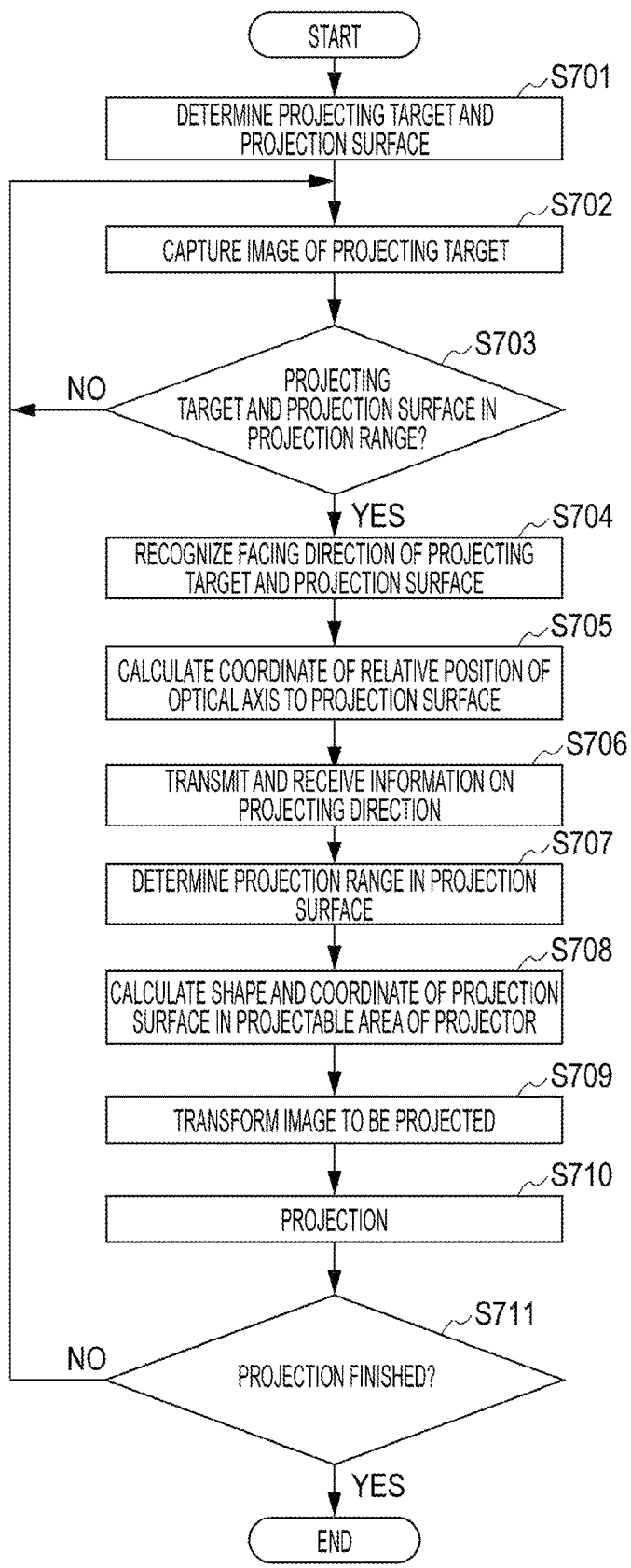
FIG. 7 is a flow chart of an operation of the projector according to the second embodiment.

The processing performed by the projector 600 illustrated in FIG. 6 will now be described referring to the flow chart illustrated in FIG. 7. In a case when the projector 100 is embedded with the processor 1001, the RAM 1002, and the ROM 1003, the processing illustrated in FIG. 7 is realized by the processor 1001 executing a program stored in the memory 1002. Alternatively, a portion of or the whole processing illustrated in FIG. 7 may be performed by hardware.

The processing from step S701 to step S704 is substantially the same as the processing from S201 to S204 in the flow chart illustrated in FIG. 2, so that the description will be omitted.

In step S705, the identifying unit 620 identifies the projecting direction of the projector 600.

Then in step S706, the transmitting and receiving unit 621 transmits the information indicating the projecting direction of the projector 600 identified by the identifying unit 620 to the other projector 650. The information identified by the identifying unit 620 may be transmitted by the transmitting and receiving unit 621 to the control apparatus connected to the projector 600, and then transferred by the control apparatus to the other projector 650.

The transmitting and receiving unit 621 receives the information indicating the projecting direction of the other projector 650 from the other projector 650 or the control apparatus provided in the periphery. In the embodiment, the transmitting and receiving unit 621 outputs the relative relationship between the projecting directions of the projectors 600 and 650 and the projection areas 801 and 802 to the determination unit 605. The relative relationship may be the intersecting angle between the optical axis and the projection area.

Then in step S707, the determination unit 605 determines the coordinate indicating the position of the projection area of the projector 600 in the coordinate system determined on the projectable range of the projector 600.

Then in step S708, the determination unit 605 determines the range of the projection area 801 on which the projector 600 projects an image based on the relative relationship between the projectors 600 and 650 and the projection areas 801 and 802. The method of determining the projection area 801 will be described later referring to FIG. 9.

The processing from step S709 to step S711 is substantially the same as the processing from S206 to S208 in the flow chart illustrated in FIG. 2 for the first embodiment, so that the description will be omitted.

Figure 9:
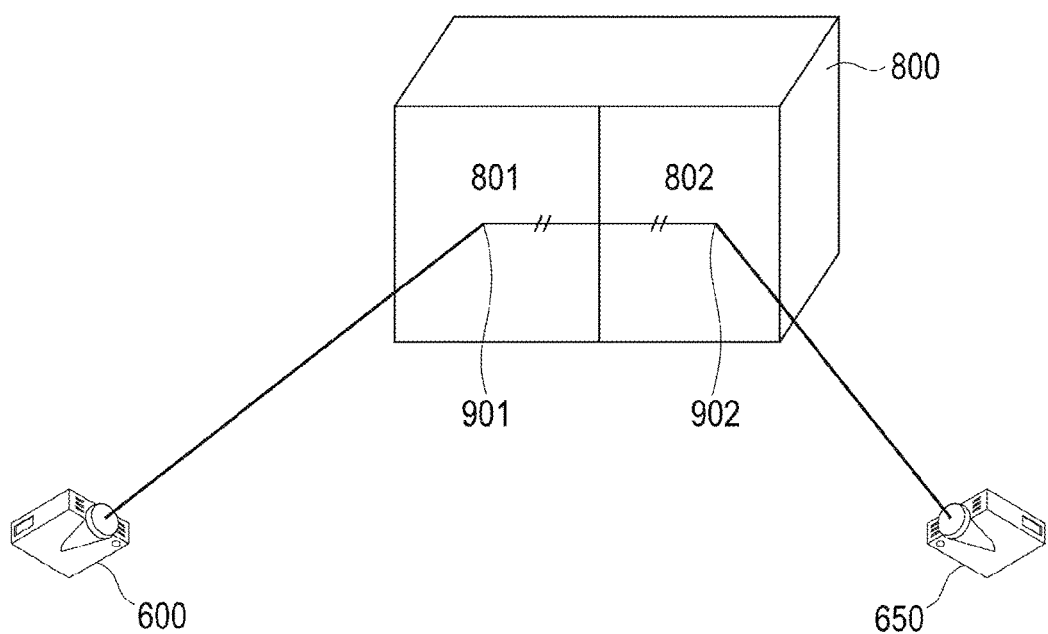
FIG. 9 explains a method of determining a projection area for projecting an image using a plurality of projectors according to the second embodiment.

The processing in step S708 will now be described referring to FIGS. 9 and 12. The determination unit 605 determines the position of an intersection point 901 between the projection surface of the solid 800 and the optical axis of the projector 600 based on the position and the facing direction of the screen and the projecting direction of the projector 600 (S1201). The determination unit 605 also determines the position of an intersection point 902 between the projection surface of the solid 800 and the optical axis of the projector 650 based on the position and the facing direction of the screen and the projecting direction of the projector 650 (S1202).

Then a distance L1 from an arbitrary point P(i) on the solid 800 to the intersection point 901 is obtained (S1203). The distance L2 from the point P(i) to the intersection point 902 is also obtained (S1204). The letter "i" is an integer from 1 to N.

The determination unit 605 compares L1 with L2 (S1205). If L1 is equal to or smaller than L2 (YES in S1205), the determination unit 605 determines the area including the point P(i) as the projection area of the projector 600 (S1206). If L1 is larger than L2 (NO in S1205), the determination unit 605 determines the area including the point P(i) as the projection area of the projector 650 (S1207).

When the projector for projecting an image on the area including the point P(i) is determined, the determination unit 605 increments "i" (S1208). Whether the incremented number "i" is equal to or smaller than N is decided (S1209). If "i" is equal to or smaller than N (NO in S1209), the processing from step S1203 to step S1209 is repeated. If the incremented number "i" is larger than N (YES in S1209), it is determined that determination has been made for every point on the projection surface of the solid 800, and the processing finishes.

In this manner, the first projecting part (projecting part 108) projects an image on the area in which L1 is shorter than L2 among projection areas on the screen in the captured image. L1 is the distance from the intersection point of the optical axis of the first projecting part (projecting part 108) and the projection area. L2 is the distance from the intersection point of the optical axis of the second projecting part (projecting part of the projector 650) and the projection area.

The projector 650 performs image processing to the projection area 802 in a similar manner to project an image resulting from transformation processing on the projection area 802. The projector 650 may receive from the projector 600 the result of determination, which is obtained by the determination unit 605 of the projector 600 performing the processing illustrated in FIG. 12, to determine the projection range of the projector 650.

As described above, the projection areas 801 and 802 change along with the movement of the solid 800 as illustrated in FIG. 8 to project an image on the projection area in a manner that the two projectors each projects an image in a range in which the distance from any point to the intersection point between the optical axis of the projector and the projection surface is closer than the distance from the point to the intersection point between the optical axis of the other projector and the projection surface.

In this manner, even when a plurality of projectors simultaneously project images on the screen having a solid shape, the images can be projected in a manner corresponding to the shape of the projection surface.

The shape information is not always necessary. By controlling the first projecting unit to project an image on a projection surface (screen) based on the position information for identifying the position of the projection surface on which the first projecting unit project an image and the projection information related to the projection performed by the second projecting unit other than the first projecting unit (for example, a projecting direction), a plurality of projecting units can cooperatively project an image on the moving projection surface. Although, an image can be displayed in a manner more accurately corresponding to the shape by using shape information in a case where an image is projected on a solid object.

Other Embodiments

As described above, the projectors 100, 600, and 650 each controls its own projecting part to project an image in the first embodiment and the second embodiment, although the scope of the invention is not limited to such configuration. For example, the control apparatus controlling projection can be controlled by a projection control system connected external to the projector to provide a similar effect. For example, the control apparatus may be configured to include at least the acquiring unit 101, the determination unit 104, and the determination unit 105 among functional blocks illustrated in FIG. 1.

The present invention can be realized by supplying a program for performing one or more functions of the embodiments described above to a system or an apparatus via a network or a storage medium and reading and executing the program by one or more processors in a computer included in the system or the apparatus. Alternatively, the present invention can be realized by a circuit (for example, ASIC) that performs one or more of the functions.

According to the embodiments described above, an image can be projected on a solid screen in a manner desired by a user by considering the shape of the solid screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-218725, filed Oct. 27, 2014, which is hereby incorporated by reference herein in its entirety.

What is claimed is:

1. A control apparatus comprising:
    a first acquiring unit configured to acquire first position information relating to a position of a first projection surface on which a first projecting unit projects an image;
    a second acquiring unit configured to acquire second position information relating to a position of a second projection surface on which a second projecting unit projects an image;
    a determining unit configured to determine, in a case where the first projection surface based on the first position information and the second projection surface based on the second position information are at least partially overlapped, a projecting unit for projecting an image on the overlapped region among the first and second projecting units based on (i) a position of the first projecting unit, (ii) a position of the second projecting unit and (iii) a position of the overlapped region; and
    a controlling unit configured to control the first projecting unit to project an image on a projection surface according to the determination by the determining unit.

2. The control apparatus according to claim 1, wherein the controlling unit corrects an image to be projected by the first projecting unit according to the position of the first projection surface.

3. The control apparatus according to claim 1, wherein the controlling unit changes a projecting position where the first projecting unit projects an image when the first projection surface moves.

4. The control apparatus according to claim 1, wherein the second position information indicates a projecting direction of the second projecting unit.

5. The control apparatus according to claim 1, wherein an image projected by the first projecting unit is a moving image.

6. The control apparatus according to claim 1, wherein the second position information indicates a relative position of a projecting direction of the second projecting unit to the second projection surface.

7. The control apparatus according to claim 1, wherein
    the first acquiring unit acquires first relative information indicating a relative position of a projecting direction of the first projecting unit to the first projection surface based on the first position information, the second position information is second relative information indicating a relative position of a projecting direction of the second projecting unit to the second projection surface, and the determining unit determines the projecting unit for projecting an image on the overlapped region based on the first relative information and the second relative information.

8. The control apparatus according to claim 1, wherein the first position information is acquired from an image capturing the first projection surface.

9. The control apparatus according to claim 1, further comprising a shape acquiring unit configured to acquire shape information related to a shape of the first projection surface, wherein the controlling unit controls the first projecting unit to project an image on the projection surface based on the shape information.

10. The control apparatus according to claim 9, further comprising a storing unit configured to store the shape information, wherein the shape acquiring unit acquires the shape information from the storing unit.

11. The control apparatus according to claim 1, wherein the determining unit determines that the first projecting unit projects an image on the overlapped region in a case where a distance between a first intersection point and the overlapped region is shorter than a distance between a second intersection point and the overlapped region, wherein the first intersection point is an intersection point between the first projection surface and an optical axis of the first projector and the second intersection point is an intersection point between the second projection surface and an optical axis of the second projector.

12. A control method comprising:

acquiring first position information relating to a position of a first projection surface on which a first projecting unit projects an image;

acquiring second position information relating to a position of a second projection surface on which a second projecting unit projects an image;

determining, in a case where the first projection surface based on the first position information and the second projection surface based on the second position information are at least partially overlapped, a projecting unit for projecting an image on the overlapped region among the first and second projecting units based on (i) a position of the first projecting unit, (ii) a position of the second projecting unit and (iii) a position of the overlapped region; and controlling the first projecting unit to project an image on a projection surface according to the determination by the determining.

13. A storage medium readable by a computer and storing a program that instructs a computer to:

acquire first position information relating to a position of a first projection surface on which a first projecting unit projects an image, acquire second position information relating to a position of a second projection surface on which a second projecting unit projects an image, determine, in a case where the first projection surface based on the first position information and the second projection surface based on the second position information are at least partially overlapped, a projecting unit for projecting an image on the overlapped region among the first and second projecting units based on (i) a position of the first projecting unit, (ii) a position of the second projecting unit and (iii) a position of the overlapped region; and control the first projecting unit to project an image on a projection surface according to the determination determined.

* * * * *